(12) United States Patent
Jiang et al.

(10) Patent No.: US 8,739,042 B2
(45) Date of Patent: *May 27, 2014

(54) USER INTERFACE DESIGN FOR TELECOMMUNICATIONS SYSTEMS

(75) Inventors: Baofeng Jiang, Pleasanton, CA (US); Jerold D. Osato, Pinole, CA (US); Xidong Wu, Livermore, CA (US); Raghbendra G. Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 905 days.

This patent is subject to a terminal disclaimer.

(21) Appl. No.: 12/850,680

(22) Filed: Aug. 5, 2010

(65) Prior Publication Data
US 2010/0299605 A1   Nov. 25, 2010

Related U.S. Application Data

(63) Continuation of application No. 10/288,225, filed on Nov. 5, 2002, now Pat. No. 7,802,189.

(51) Int. Cl.
*G06F 3/00* (2006.01)

(52) U.S. Cl.
USPC ........... 715/736; 715/731; 715/735; 715/739; 715/853

(58) Field of Classification Search
None
See application file for complete search history.

(56) References Cited

U.S. PATENT DOCUMENTS

| 5,726,979 | A | 3/1998 | Henderson et al. |
|---|---|---|---|
| 5,774,655 | A | 6/1998 | Bloem et al. |
| 5,832,069 | A | 11/1998 | Waters et al. |
| 5,870,558 | A | 2/1999 | Branton, Jr. et al. |
| 6,058,103 | A | 5/2000 | Henderson et al. |
| 6,111,561 | A | 8/2000 | Brandau et al. |
| 6,115,743 | A | 9/2000 | Cowan et al. |
| 6,205,495 | B1 | 3/2001 | Gilbert et al. |
| 6,208,345 | B1 | 3/2001 | Sheard et al. |
| 6,259,679 | B1 | 7/2001 | Henderson et al. |
| 6,285,688 | B1 | 9/2001 | Henderson et al. |
| 6,343,290 | B1 | 1/2002 | Cossins et al. |
| 6,611,867 | B1 | 8/2003 | Bowman-Amuah |
| 6,615,166 | B1 | 9/2003 | Guheen et al. |
| 6,754,181 | B1 | 6/2004 | Elliott et al. |
| 7,225,250 | B1 * | 5/2007 | Harrop ......................... 709/224 |
| 7,493,562 | B2 * | 2/2009 | Kui et al. ...................... 715/736 |
| 2002/0029168 | A1 | 3/2002 | McConnell, Jr. et al. |
| 2002/0078131 | A1 | 6/2002 | Dowd et al. |

(Continued)

FOREIGN PATENT DOCUMENTS

WO        0017763        3/2000

OTHER PUBLICATIONS

Non-Final Office Action for U.S. Appl. No. 10/288,225 mailed Dec. 14, 2005, 13 pages.

(Continued)

*Primary Examiner* — Matt Kim
*Assistant Examiner* — Mahelet Shiberou
(74) *Attorney, Agent, or Firm* — Toler Law Group, PC

(57) ABSTRACT

In a particular embodiment, a display includes a first interface and a second interface. The first interface is organized by data communications network technology area and the second interface is grouped by operational function. Each operational function includes a summary view and a detailed functional view.

20 Claims, 3 Drawing Sheets

(56) References Cited

U.S. PATENT DOCUMENTS

| | | |
|---|---|---|
| 2002/0087671 A1 | 7/2002 | Weisser, Jr. et al. |
| 2002/0094798 A1 | 7/2002 | Nurminen et al. |
| 2002/0152305 A1 | 10/2002 | Jackson et al. |
| 2002/0158899 A1 | 10/2002 | Raymond |
| 2002/0161848 A1 | 10/2002 | Willman et al. |
| 2002/0169700 A1 | 11/2002 | Huffman et al. |
| 2004/0135804 A1 | 7/2004 | Pellaz et al. |
| 2004/0267729 A1 | 12/2004 | Swaminathan et al. |
| 2009/0074411 A1* | 3/2009 | Bernard et al. ............ 398/58 |

OTHER PUBLICATIONS

Final Office Action for U.S. Appl. No. 10/288,225 mailed Apr. 17, 2006, 13 pages.
Remarks in Support of the Pre-Appeal Brief Request for Review for U.S. Appl. No. 10/288,225 filed Jun. 27, 2006, 5 pages.
Brief in Support of Appeal for U.S. Appl. No. 10/288,225 mailed Aug. 11, 2006, 18 pages.
Examiner's Answer to Appeal Brief for U.S. Appl. No. 10/288,225 mailed Nov. 1, 2006, 16 pages.
Examiner's Answer to Appeal Brief for U.S. Appl. No. 10/288,225 mailed Dec. 4, 2006, 16 pages.
Reply Brief for U.S. Appl. No. 10/288,225, filed Jan. 9, 2007, 21 pages.
Examiner's Answer to Reply Brief for U.S. Appl. No. 10/288,225 mailed Feb. 26, 2007, 17 pages.
Decision on Appeal for U.S. Appl. No. 10/288,225 mailed May 3, 2010, 9 pages.
Notice of Allowance and Fee(s) Due for U.S. Appl. No. 10/288,225 mailed May 24, 2010, 10 pages.

* cited by examiner

USER INTERFACE DESIGN FOR TELECOMMUNICATIONS SYSTEMS

CLAIM OF PRIORITY

The present application claims priority from and is a continuation of patent application Ser. No. 10/288,225 filed on Nov. 5, 2002 and entitled "USER INTERFACE DESIGN FOR TELECOMMUNICATIONS SYSTEMS", the contents of which are expressly incorporated herein by reference in their entirety.

FIELD OF THE DISCLOSURE

The present disclosure relates generally to a user interface design for telecommunications systems.

BACKGROUND

Many software tools are used for the management of telecommunications networks. Many of such tools are dependent on the details of a particular equipment vendor's product. Others are specific to a particular function to be performed. While function specific and vendor dependent tools may be used, it would be desirable to provide an improved user interface that may be used by a network operator to perform a broad range of network management functions and that is independent of any specific vendor or technology.

Accordingly, there is a need for an improved network management user interface.

BRIEF DESCRIPTION OF THE DRAWINGS

The use of the same reference symbols in different drawings indicates similar or identical items.

DETAILED DESCRIPTION

In a particular embodiment, a user terminal is configured to generate a display that includes a first interface organized by data communications network technology area and a second interface grouped by operational function. Each operational function includes a summary view and a detailed functional view, where each summary view is organized as a drill down view based on a set of view detail levels.

In another particular embodiment, a method includes displaying a first view of a user interface to a network operations support system at a user terminal. The first view is organized by data communications network technology area and identifies a plurality of different data communications network technologies. The method also includes displaying a second view of the user interface to the network operations support system at the user terminal. The second view is grouped by operational function, where each operational function includes a summary view and a detailed functional view. Each summary view is organized as a drill down view based on a set of detail levels.

In another particular embodiment, a user terminal is configured to generate a display including a user interface to a telecommunications network support system. The user interface includes a first level view organized by network technology area and a second level view identifying operations information associated with each network technology area. The second level view is organized into sub-categories of one or more operational functions.

Figure 1:
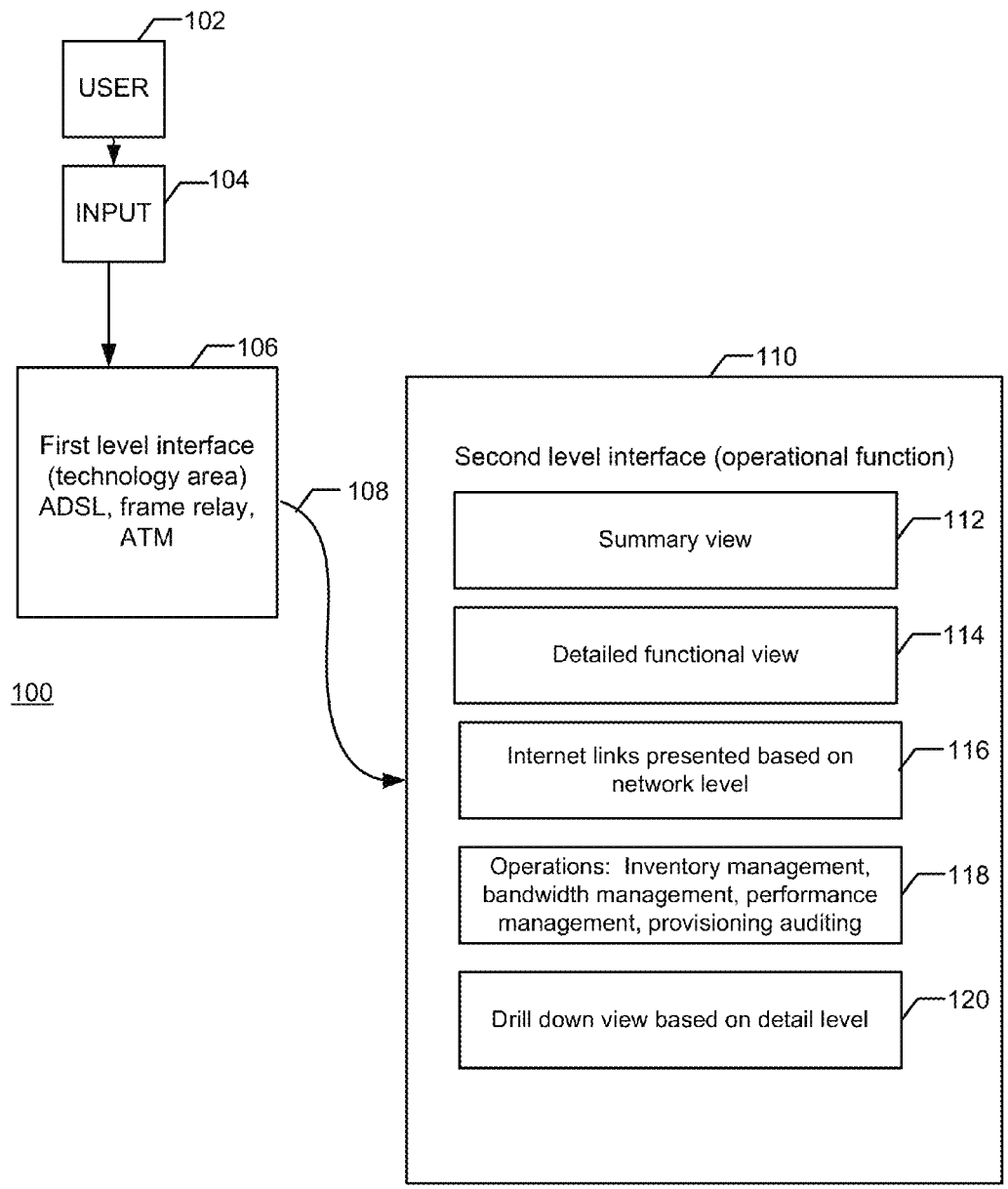
FIG. 1 is a block diagram of a user interface design for telecommunications system.

Referring to FIG. 1, a user interface 100 is disclosed. The user interface 100 includes a first level interface 106 and a second level interface 110. The first level interface 106 includes a plurality of different available technology areas such as asymmetric digital subscriber loop (ADSL), frame relay, and asynchronous transfer mode (ATM). The first level interface 106 is responsive to a user 102 via input 104. The first level interface 106 is coupled to the second level interface 110 via link 108. The second level interface 110 is an operational functional interface that includes a plurality of different views. The second level interface 110 includes a summary view 112, a detailed functional view 114, an operations view 118, and a drill down view based on detail level 120. Internet links 116 are presented based on the particular network levels (e.g., regional or pinpoint). The operations view 118 includes a variety of available operations that may be performed, including inventory management, bandwidth management, performance management and provisioning auditing. A user 102, via an input command 104, may traverse between the first level interface 106 and the second level interface 110.

Figure 2:
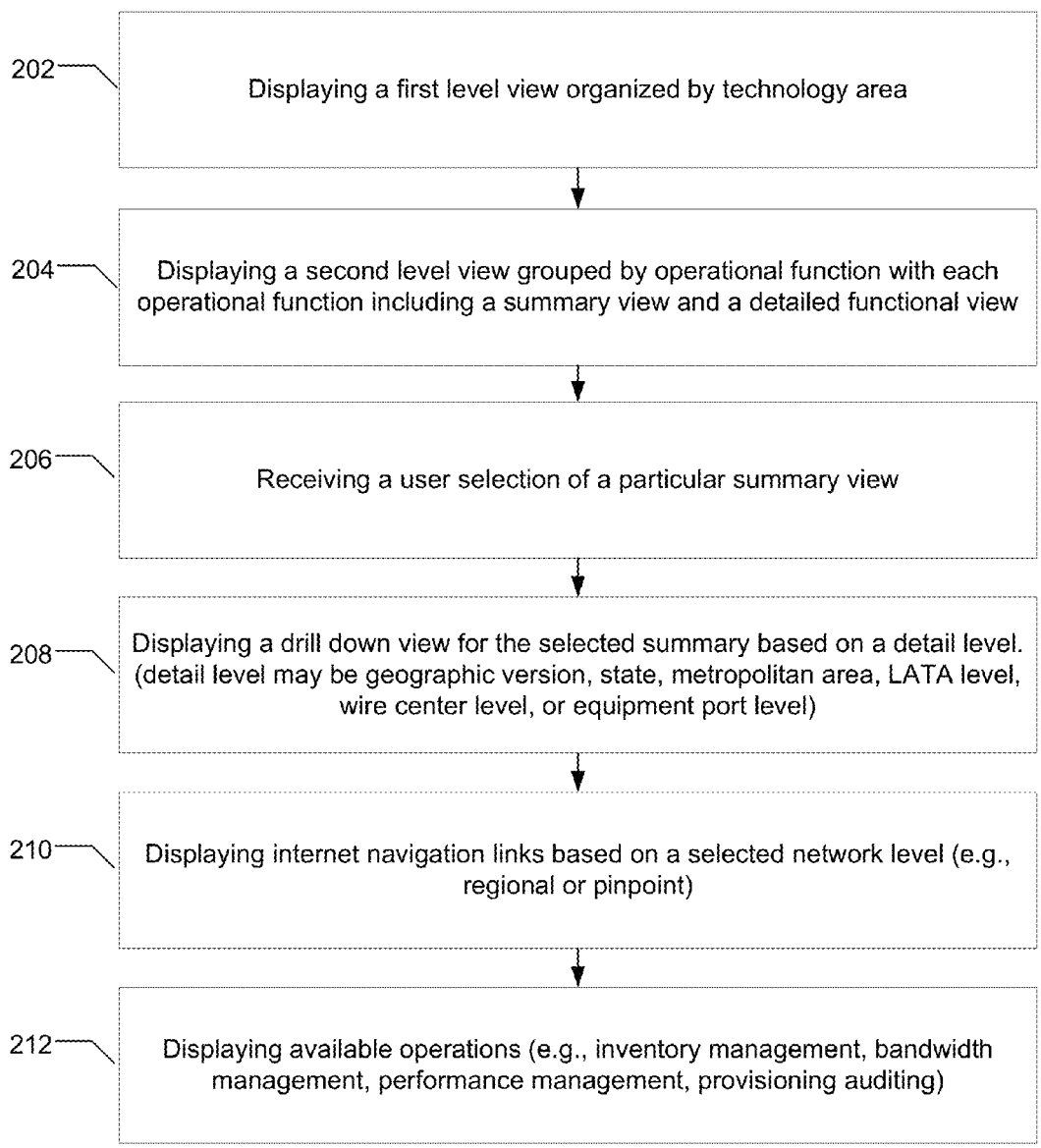
FIG. 2 is a flow chart that illustrates a method of using an illustrative user interface.

Referring to FIG. 2, a method of using an illustrative user interface is shown. A first level view that is organized by technology area is displayed, at 202. A second level view grouped by operational function is displayed, at 204. The operational function view includes a summary view and a detailed functional view. A user selection is received in response to a particular summary view, at 206. After the user selection, a drill down view for the selected summary portion is displayed at a detailed level, at 208. The detail level may include geographic version, a particular state, metropolitan area, local access transport area (LATA) level, wire center level, or equipment port level. Internet navigation links based on a selected network level are displayed, at 210. An example of a network level is a regional level or a detailed pinpoint level. Available operations are then displayed, at 212. Examples of available operations include inventory management, bandwidth management, performance management and provisioning auditing.

Figure 3:
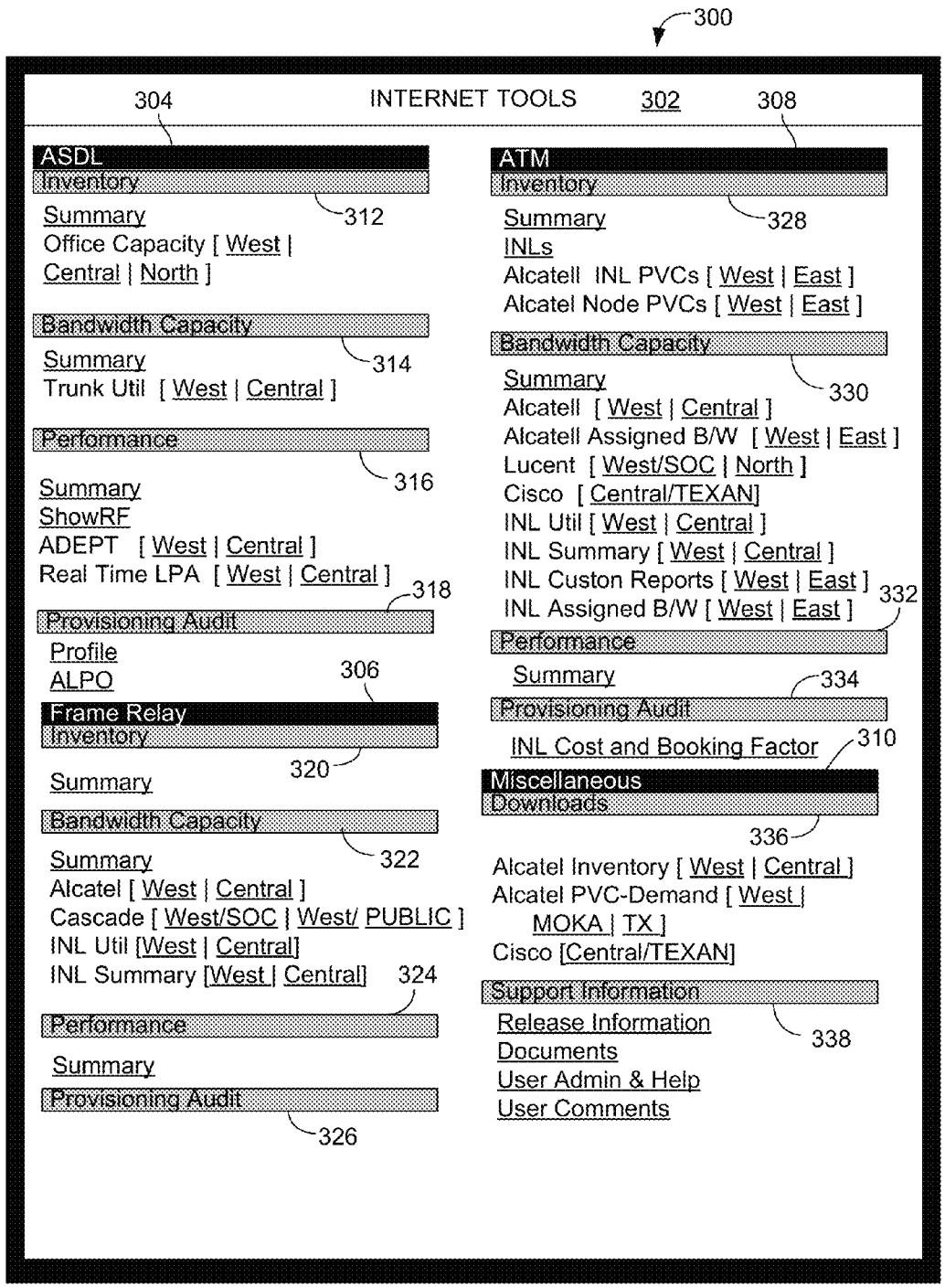
FIG. 3 is an illustrative screen shot of a user interface.

Referring to FIG. 3, an illustrative screen shot 300 of a user interface 302 that includes first level views 304, 306, 308, and 310 based on technology areas and links to second level views 312-338 that include summary and other operational capabilities is illustrated. The user interface 302 illustrated in FIG. 3 is organized by technology area and is vendor independent. The user interface 302 provides for multiple subsystems and allows users to easily cross technology areas without the need to deal with distinct interfaces for each specific technology. Thus, a set of unified operational tools that is applicable across different network technologies has been integrated into a single user interface 302. The user interface 302 may be displayed at a plurality of different terminals, and in one particular implementation, the user interface 302 utilizes the distribution capabilities of the Internet.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
 a processor;
 a user terminal configured to provide instructions to the processor to generate a display comprising:
  a first interface organized by data communications network technology area; and
  a second interface grouped by operational function, wherein each operational function includes a summary view and a detailed functional view, and wherein each summary view is organized as a drill down view based on a set of view detail levels.

2. The system of claim 1, wherein the first interface identifies a plurality of different data communications network technologies.

3. The system of claim 2, wherein the plurality of different data communications network technologies includes asymmetric digital subscriber line, frame relay, Ethernet, asynchronous transfer mode, or any combination thereof.

4. The system of claim 1, wherein the second interface identifies a plurality of operational functions.

5. The system of claim 4, wherein the plurality of operational functions includes inventory management, bandwidth management, performance management, provisioning auditing, or any combination thereof.

6. The system of claim 1, wherein the detailed functional view comprises a set of view detail levels.

7. The system of claim 6, wherein the set of view detail levels includes a geographic region level, a state or metropolitan area level, a local access transport area level, a wire center level, an equipment port level, or any combination thereof.

8. The system of claim 6, wherein each view detail level of the set of view detail levels includes Internet navigation links based on a particular network level.

9. The system of claim 8, wherein the particular network level includes a regional level or a pinpoint level.

10. The system of claim 1, wherein the first interface is vendor independent.

11. A method, comprising:
 displaying a first view of a user interface to a network operations support system at a user terminal, wherein the first view is organized by data communications network technology area, and wherein the first view identifies a plurality of different data communications network technologies; and
 displaying a second view of the user interface to the network operations support system at the user terminal, wherein the second view is grouped by operational function, wherein each operational function includes a summary view and a detailed functional view, wherein the second view identifies a plurality of different operational functions, and wherein each summary view is organized as a drill down view based on a set of detail levels.

12. The method of claim 11, wherein the detailed functional view comprises a set of detail levels including a geographic region level, a state or metropolitan area level, a local access transport area level, a wire center level, and an equipment port level.

13. The method of claim 11, further comprising receiving input indicating a selected network level.

14. The method of claim 13, further comprising displaying internet navigational links based on the selected network level.

15. The method of claim 13, wherein the selected network level is one of a regional level and a pinpoint level.

16. The method of claim 11, wherein the network operations support system has access to a plurality of different network analysis subsystems.

17. The method of claim 11, wherein the plurality of different data communications network technologies includes digital subscriber line, frame relay, Ethernet, and asynchronous transfer mode technologies.

18. The method of claim 11, further comprising displaying a set of operational functions including inventory management, bandwidth management, performance management, and provisioning auditing.

19. A system, comprising:
 a processor;
 a user terminal configured to provide instructions to the processor to generate a display comprising a user interface to a telecommunications network support system, the user interface comprising:
  a first level view organized by network technology area; and
  a second level view identifying operations information associated with each network technology area, wherein the second level view is organized into subcategories of operational functions.

20. The system of claim 19, wherein the operations information comprises a summary view of each operational function.

* * * * *